(12) United States Patent
Beals

(10) Patent No.: US 10,187,402 B2
(45) Date of Patent: Jan. 22, 2019

(54) NETWORK INTRUSION MITIGATION

(71) Applicant: EchoStar Technologies L.L.C., Englewood, CO (US)

(72) Inventor: William Michael Beals, Englewood, CO (US)

(73) Assignee: EchoStar Technologies International Corporation, Englewood, CO (US)

( * ) Notice: Subject to any disclaimer, the term of this patent is extended or adjusted under 35 U.S.C. 154(b) by 372 days.

(21) Appl. No.: 14/952,479

(22) Filed: Nov. 25, 2015

(65) Prior Publication Data

US 2017/0149806 A1    May 25, 2017

(51) Int. Cl.
| | |
|---|---|
| *H04L 29/06* | (2006.01) |
| *H04W 12/08* | (2009.01) |
| *H04L 29/08* | (2006.01) |
| *G06F 11/07* | (2006.01) |
| *H04L 29/14* | (2006.01) |
| *H04W 12/12* | (2009.01) |
| *H04W 84/18* | (2009.01) |

(52) U.S. Cl.
CPC ........ *H04L 63/1416* (2013.01); *G06F 11/076* (2013.01); *G06F 11/0709* (2013.01); *G06F 11/0736* (2013.01); *H04L 67/12* (2013.01); *H04L 67/141* (2013.01); *H04L 67/22* (2013.01); *H04L 69/40* (2013.01); *H04W 12/08* (2013.01); *H04W 12/12* (2013.01); *H04W 84/18* (2013.01)

(58) Field of Classification Search
CPC .................................................. H04L 63/1416
USPC ............................................................ 726/4
See application file for complete search history.

(56) References Cited

U.S. PATENT DOCUMENTS

| | | | | |
|---|---|---|---|---|
| 8,589,541 | B2 * | 11/2013 | Raleigh | H04L 41/0893 709/224 |
| 9,648,148 | B2 * | 5/2017 | Rimmer | H04L 69/22 |
| 2003/0093187 | A1 * | 5/2003 | Walker | B64C 13/20 701/1 |
| 2006/0019679 | A1 * | 1/2006 | Rappaport | G01S 5/0252 455/456.5 |
| 2007/0245417 | A1 * | 10/2007 | Lee | H04L 63/1458 726/22 |
| 2008/0229389 | A1 * | 9/2008 | Singh | G06F 21/6209 726/3 |
| 2010/0202345 | A1 * | 8/2010 | Jing | H04L 12/2832 370/328 |
| 2013/0201316 | A1 * | 8/2013 | Binder | H04L 67/12 348/77 |
| 2014/0153434 | A1 * | 6/2014 | Kokovidis | H04W 52/0238 370/252 |
| 2016/0127931 | A1 * | 5/2016 | Baxley | G01S 5/0263 455/67.16 |

* cited by examiner

*Primary Examiner* — Khalil Naghdali
(74) *Attorney, Agent, or Firm* — Bejin Bieneman PLC

(57) ABSTRACT

A request is received to reestablish a connection to an end device in a network. At least one datum is identified indicating an error condition, the at least one datum including one or more of a bit error rate (BER), a received signal strength indicator (RSSI) value, and a foreign packet. Based on the one or more data values, user input is requested to deny the reestablish connection request. In response to the user input, the end device is prevented from reestablishing a link on the network.

19 Claims, 2 Drawing Sheets

NETWORK INTRUSION MITIGATION

BACKGROUND

Automated monitoring and control solutions of home and industrial environments have led to safer homes and increased efficiencies of production processes. However, until recently, the full potential of automated monitoring and control solutions was held back by limitations of conventional wired networks. Wireless automated solutions enhance both data acquisition scope and reliability while facilitating growth and expansion through the deployment of highly scalable systems. Wireless automated systems can be implemented in any securable platform, for example, on a ZigBee® platform.

The ZigBee platform is based upon the IEEE (Institute of Electrical and Electronics Engineers) 802.15.4 standard and has seen significant growth and acceptance in home and industrial applications. ZigBee can be found in a relatively large number of devices and systems, e.g., home entertainment, home automation, smart lighting, advanced temperature control, safety and security, movies and music, wireless sensor networks, industrial controls, embedded sensing, medical data collection and building automation. ZigBee devices typically consume small amounts of power and deploy a mesh network structure. Mesh networks are reliable because they offer redundancy. When one node can no longer operate, the rest of the nodes can still communicate with each other, directly or through one or more intermediate nodes.

ZigBee devices can contain integrated circuits with a combination of a computer processor, a memory and input/output ports combined with a radio transceiver. The Zig-Bee's radios usually operate in the industrial, scientific and medical (ISM) radio bands, which includes 2.4 GHz in most jurisdictions worldwide with data rates varying from 20 kbit/s to 250 kbit/s.

A potential security issue can occur when the network receives request from a wireless automated device currently paired with the network to reestablish its connection, i.e., "re-pair," with the network. Pairing is a known process used in computer networking that sets up a linkage between computing devices to allow communications between them. When a pairing successfully completes between two devices, e.g., a network controller or "host," and a network device such as a home automation sensor, actuator, etc., a link is established between the two devices, enabling those two devices to connect to each other in the future without repeating the pairing process to confirm device identities.

DRAWINGS

DESCRIPTION

Introduction

In networks that support pairing of devices, e.g., a ZigBee network, a rogue device may interfere with, e.g., "jam," radio frequency communications between the device and the host, causing a user to believe that reestablishing its connection and pair again with a host is necessary. When the host device is placed into pairing mode, the rogue device can "jump in" and pair with the host since the master pairing encryption keys are known in the art. Presently disclosed systems and methods provide a solution to this problem that arises in the context of wireless computer networks.

Figure 1:
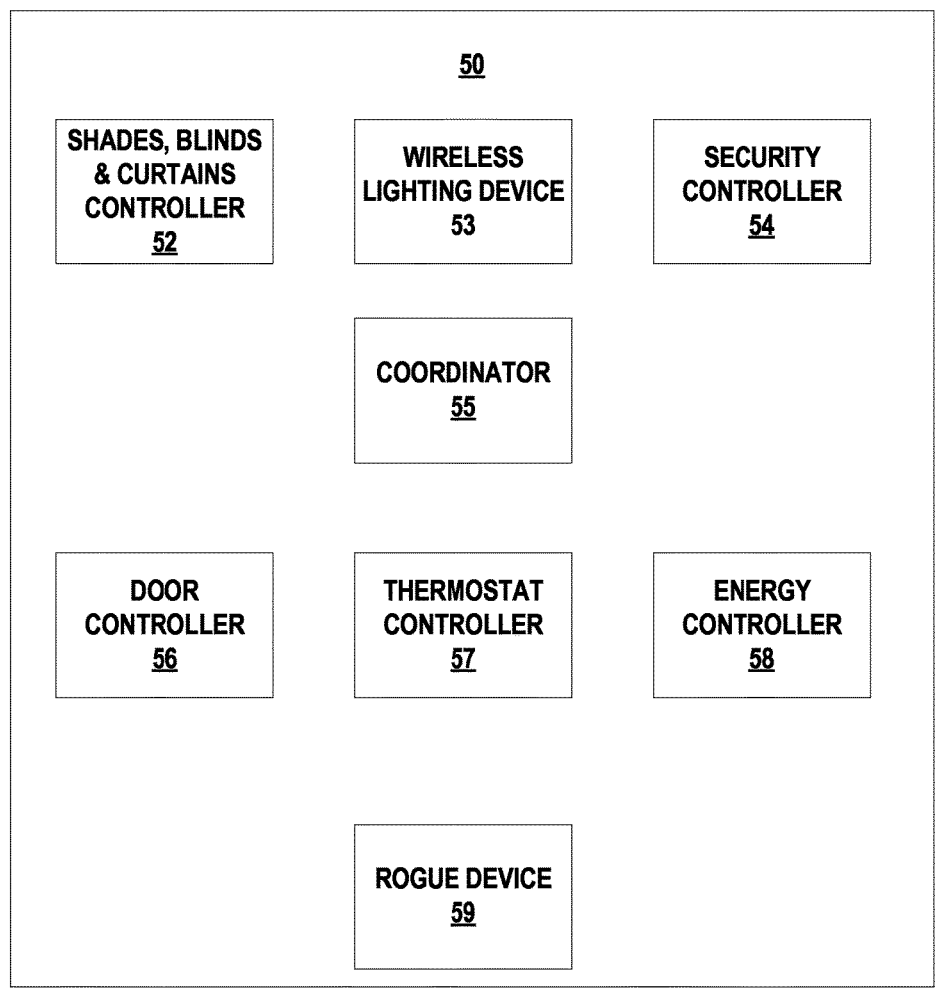
FIG. 1 is a block diagram of an exemplary wireless home automation network system.

FIG. 1 is a block diagram of an exemplary wireless home automation network 50. As disclosed herein, the wireless home automation network 50 approach to home automation allows multiple home automation applications to be controlled through a same network infrastructure without the costly installation of a network wiring the home and can be installed or expanded at any time to cover a wider area. Advantageously, a network coordinator 55 can be programmed, upon receiving a reestablish connection request, i.e., to pair again with a device, to determine, based on one or more data, whether the request is a possible attack, and to prevent or allow the requested re-pairing based on the determination.

The network 50 can be a ZigBee network with ZigBee compliant devices as is known, but alternatively can be any securable network platform such as may be known, including a Z-wave platform, a I.E.E.E. 802.11 Wi-Fi platform, a Bluetooth platform, a IPv6 over Low power Wireless Personal Area Networks (6lowPAN) platform, etc.

There are three types of ZigBee devices: a ZigBee coordinator, a ZigBee router and a ZigBee end device. The ZigBee coordinator (e.g., a coordinator 55 is shown in the context of the system 50) forms the root of a ZigBee network and can bridge to other networks. There is exactly one ZigBee coordinator in each network because it is the device that originally initiated creation of the network. The coordinator stores information about the network, including acting as a trust center and repository for security keys. A ZigBee router can act as an intermediate router, passing data to and from other devices. A ZigBee end device has programming to conduct communications with a parent node, which is either the coordinator or the router. The ZigBee end device cannot relay data from other devices. This relationship allows the node to be inactive, i.e., "sleep," a significant amount of the time, thereby permitting long battery life.

Exemplary System Elements

The wireless home automation network 50 can be, for example, a ZigBee network. A coordinator 55 is communicatively coupled in a manner known in, e.g., ZigBee networks, to a plurality of end devices such as a shades, blinds and curtain controller 52, a wireless lighting controller 53, a security controller 54, a wireless door lock 56, a wireless thermostat 57 and an energy controller 58. The controllers 52, 53, 54, 56, 57, and 58, and the coordinator 55, are typically known devices that each include processors, memories that store instructions executable by the processors, batteries or other power storage devices, RF transceivers, etc.

The coordinator 55 controls the formation and security of home network 50, e.g., formation of a ZigBee network such as is known, and implementations of security protocols as are known for such networks in addition to security mechanisms disclosed herein.

The coordinator 55 can be also be a gateway to a wide area network such as the Internet and can thereby provide even more control flexibility of the network 50. In a smart home, for example, the coordinator 55 can be the central point of a home security and comfort control system with support for lighting, cooling and security. The centrally located coordinator 55 allows a user to easily program and instruct the control devices, e.g., a series of light fixtures can be controlled from the wireless lighting controller 53, air conditioners can be controlled from the thermostat controller 57, door locks can be controlled from the door controller 56 and security cameras can be controlled from the security controller 54. The energy controller 58 can monitor room occupancy sensors for people or pets. For example, if the energy monitor 58 detects that a room is occupied, the thermostat 57 can be programmed to maintain a minimum temperature in the room for a comfort level to be maintained.

The shades, lighting and curtains (SLAC) controller 52 can be implemented to control shades and window coverings from various points throughout the home, including wall mounted control units, remote control units, smartphones, tablets and computers. The SLAC controller 52 can open and close attached shades and window coverings, including their partial opening and closing. The controller 52, for example, can control a pre-defined group of shades or window coverings with a range open and close settings for the one or more shades or window coverings.

The lighting device controller 53 can control and monitor lights and switches throughout the home, including wall-switches, occupancy sensors, remote control units, and the like. The coordinator 55, for example, permits the user to easily configure the lighting device controller 53 to control a lighting scheme in terms of brightness and color for one or more lights, which can form a 'scene' for mood lighting.

The security controller 54 can be responsible for the home's security systems and can control and monitor a pre-defined group of security sensors, such as window and door sensors from the coordinator 55 location. The security controller 54 can include an intruder system, a fire system and/or a general emergency system, etc.

The door controller 56 can control and monitor various doors and their associated locks. For example, in the home security setting, the coordinator 55 can confirm that all the doors with access to the outside are closed by nine o'clock in the evening. The coordinator 55 can then instruct the door controller 56 to lock the doors and confirm that the locks have engaged.

The thermostat controller 57 and the energy controller 58 can control and monitor the homes HVAC systems. The thermostat controller 57 and the energy controller 58 working together can further control the heating and/or the air-conditioning in individual rooms according to their use and/or occupancy. The thermostat controller 57 and the energy controller 58, e.g., can be programmed to reduce the heat in a room if the room was unoccupied for more than 1 hour.

A rogue device 59 is a wireless device, such as a ZigBee communications controller with a microcontroller computer can be placed near or in the security of home network 50, e.g., by someone wishing to damage, interfere with, or assume control of, the network 50. The rogue device 59 can interfere with the coordinator 55 communications with the other wireless devices. For example, the rogue device can "jam" the communications by emitting a RF signal in the 2.4 GHZ band.

Packet Failure

When two devices exchange packets using the ZigBee standard as defined by the I.E.E.E. 802.15.4 specification, every packet sent by a first device should receive an acknowledgement from a second device that the packet was successfully received. For example, the 2.4 Ghz frequencies utilized by ZigBee can be shared with Wi-Fi systems, wireless surveillance systems, baby monitoring cameras, etc., typically making some interference between the first and second devices inevitable. A packet can be sent and resent up to three times before the sending device indicates that something unusual may be occurring. Therefore, not receiving an acknowledgement packet from the second device can indicate a communications failure.

Not receiving an acknowledgement can possibly simply indicate that the second device is powered off or, in a more sinister scenario, a failure to receive an acknowledgement can indicate that communications between the first device and the second device are being interfered with. For example, the rogue device 59 can flood the home network 50 with mal-formed or badly addressed packets can consume network resources and bandwidth in the network 50. Consequently, communications of the other devices on the network 50 are severely hampered or prevented from successfully sending or receiving data packets. Because the ZigBee protocol uses carrier sense multiple access with collision detection (CSMA/CD), the security controller 54 and the coordinator 55 will have a high packet exchange loss rate as the collisions become more frequent as dropped or missing packets will have to be resent.

One metric to measure communication's failure rate is to determine a bit error rate (BER). The BER is the number of bit errors per unit time or the number of bit errors divided by the total number of transferred bits during a studied time interval. BER is a unit less performance measure and is often expressed as a percentage.

In a next scenario, a malicious device, e.g., the rogue device 59, can merely transmit a signal on or near the frequencies used by the first device, e.g., the coordinator, 55 and can cause a high received signal strength indicator (RSSI) value. In essence, the rogue device 59 is overloading the front end of the coordinator 55 receiver. The front end of receiver is a generic term for the circuitry between the antenna and the components in the receiver that process the incoming radio frequency (RF) signal. The overloading can additionally cause either an intermodulation interference or a receiver desense of the coordinator 55. Intermodulation interference is the undesired combining of several signals in a nonlinear device, producing new, unwanted interfering frequencies and signals. Desense, or desensitivity, is the degradation in receiver sensitivity due to noise sources. Either intermodulation interference or desense will cause a high packet exchange loss rate as missed or dropped packets will have to be resent.

In a third scenario, the rogue device 59 places foreign packets into the network home network 50. The foreign packets may have legitimate packet syntax, but the source and/or destination addresses and the payloads are deceptive. The coordinator 55 can then consume valuable time and system resources trying to decipher and handle the foreign packets. For example, the rogue device 59 my impersonate the security controller 54 and attempt to send data packets to a nonexistent device on the home network 50 through the coordinator 55.

The user may choose to terminate the communications link between the coordinator 55 and the network device in any of the above scenarios and attempt to reestablish the communication through the pairing protocol. The ZigBee pairing protocol, e.g., calls for a Symmetric-Key establishment (SKKE) by creating a communications key in each device from a common key known as the master key. The master key is provided to the ZigBee devices by the manufacture of the ZigBee device.

In the SKKE protocol, the coordinator 55 can be thought of as an initiator device and the security controller 54 as a responder device. The initiator device establishes a link key using a master key and transfers a specific data set to the responder. The responder uses the data set and derives a link key. The initiator also derives the link key from the same data. If the derivation is done correctly, e.g., in a known manner, the two devices have the same link key that can be used in the symmetric key cryptography. However, as discussed above, the master keys are commonly known and can be discovered from ZigBee device manufacturer. Therefore, if a communications link is broken between the initiator device and the responder deice, a rogue third party device can "jump in" after the pairing appears broken and before the initiator device and the responder reestablish a connection and re-pair. For example, the coordinator 55 and the security controller 54 are linked. The rogue device 59 uses any of the above described methods causing the coordinator 55 to terminate the communications and drop the link. When the coordinator 55 initiates a reestablishing of its connection to re-pair with the security controller 54, the rogue device 59, knowing the master key, can imitate the security controller 54 can join the home network 50.

To prevent such an intrusion of the rogue device 59, the coordinator 55 can proactively monitor the packet exchange loss rate for high packet loss, e.g., a high BER. The coordinator 55 can monitor the RSSI values for high or abnormally high signal strengths. Additionally, the coordinator 55 can monitor the network traffic for foreign packets or spoofed packets on the network. For example, the rogue device 59, which is not authenticated on with the network, may attempt to send packets to known controllers on the network. Because the coordinator 55 administrators the network, addresses of the authorized and authenticated controllers are known addresses to the coordinator 55, whereas an address of the rogue device 59 will not be one of the known addresses. The coordinator 55 can thus monitor the network and detect when a foreign or spoofed packet is on the network.

When atypical activities occur and the coordinator 55 loses the link with the security controller 54 on the network, the coordinator 55 can send a warning to a user before the reestablishing the connection and re-pairing with the security controller 54. The coordinator 55 can additionally require an affirmative action by the user, for example, the coordinator 55 can request a confirmation to a reestablish connection request from a network administrator before reestablishing the connection and pairing again with a host. The warning can make the network administrator more cognizant of an issue on the home network 50 and the attached network devices and controllers and check the home network 50 vicinity for the rogue device 59.

Exemplary Process Flow

Figure 2:
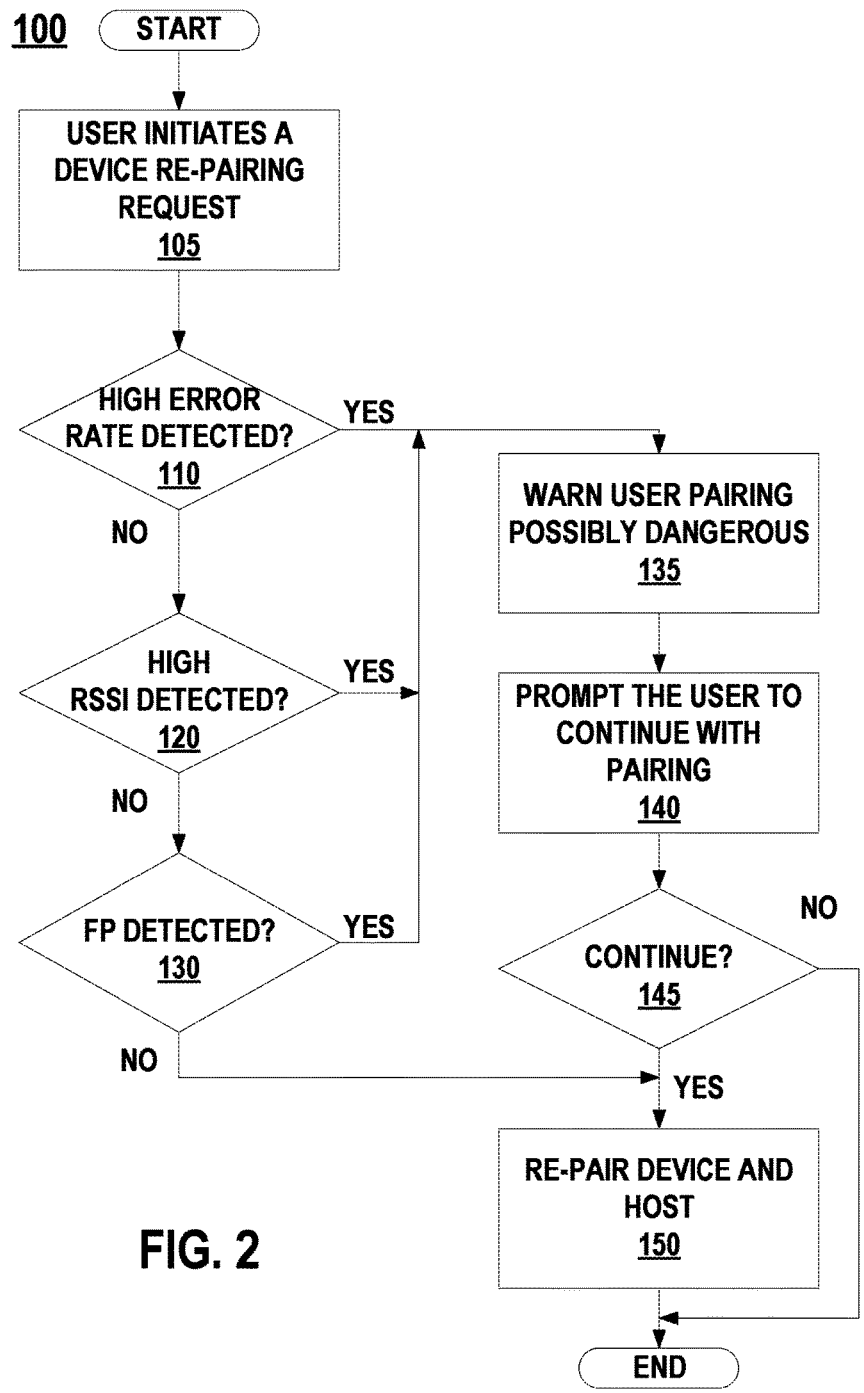
FIG. 2 is a diagram of an exemplary process for determining a communications issue with a coordinator device and a device controller.

FIG. 2 is a diagram of an exemplary process 100 for identifying a communications problem with a coordinator device and a device controller and preventing a rogue device from network infiltration. The process 100 may be executed according to program instructions executed in a computing device such as the coordinator 55.

The process 100 begins in a block 105 in which a user of the network provides input requesting to reestablish the connection between the coordinator 55 and an end device. For example, the coordinator 55 could indicate to the user that the security controller 54 is intermittently dropping packets. The user, in an attempt to alleviate the dropping packet problem, may decide that the coordinator 55 has to reestablish its connection with the security controller 54 and pair again with the coordinator 55. However, in reality but unknown to the user, a nefarious device, e.g., the rogue device 59 is causing the communication problem by any of the above described techniques. For example, the rogue device 59 can be transmitting a signal on or near frequencies used by the coordinator 55.

Next, in a block 110, a determination is made if a packet error rate or a packet loss rate exceeds a predetermined threshold. For example, if a BER exceeds a threshold of 40% packet loss, or alternatively, a time limit for which the current BER can be tolerated, e.g., when a BER timer value exceeds a predetermined BER timer threshold, then next a block 135 is executed, else next a block 120 is executed.

Next, in the block 120, the coordinator 55 determines if a high or abnormal RSSI is above either a predetermined RSSI timer threshold or a signal level. For example, the RSSI timer threshold can be set to 300 seconds and the signal level can be set to −80 dBm. If a RSSI timer value exceeds 300 or the signal strength increases to −73 dBm, next in the block 135 is executed, else in a block 130 is executed.

Next, in the block 130, the coordinator 55 determines if a foreign packet occurred by monitoring the packets on the network for packets with erroneous source and destination addresses or packets sent from unauthorized end controllers. Alternatively or additionally, the coordinator 55 can keep a tally of the quantity of discovered foreign packets. The quantity of foreign packets discovered can be compared to a predetermined foreign packet counter threshold. For example, if foreign packets do appear on the network and the quantity of foreign packets is above the foreign counter packet threshold, then the block 135 is executed next, else a block 145 is executed next.

In the block 135, the coordinator 55 sends a message to the user alerting that there was a high rate of packet errors, a higher than normal RSSI value present, or that foreign packets were detected and prevents the user from reestablishing the connection between the coordinator 55 and the end device. The message to the user can state that pairing may be dangerous.

Next in a block 140, the coordinator 55 further prompts the user to provide input indicating whether the user wishes to continue with reestablishing the connection between the coordinator 55 and the end device.

Next in a block 145, the coordinator 55 determines, based on the input received in the block 140, whether the re-pairing should continue. If not, the coordinator 55 blocks the re-airing attempt and the process 200 ends. However, if user input indicates to proceed with the re-pairing attempt, the process 200 continues in a block 150.

In the block 150, which can be executed following either the block 130 or the block 145, the coordinator 55 reestablishes the connection between the coordinator 55 and the end device, e.g., the security controller 54 or the like, in the home network 50. The process 100 then process ends.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Computing devices such as those discussed herein generally each include instructions executable by one or more computing devices such as those identified above, and for carrying out blocks or steps of processes described above.

For example, process blocks discussed above are embodied as computer-executable instructions.

Computer-executable instructions may be compiled or interpreted from computer programs created using a variety of programming languages and/or technologies, including, without limitation, and either alone or in combination, Java™, C, C++, C#, Visual Basic, Java Script, Python, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A device that includes a processor and a memory, the memory storing instructions executable by the processor such that the device is programmed to:
    receive a reestablish connection request via a first user input to terminate and then reestablish a connection to an end device in a network;
    identify at least one error condition, the at least one error condition including one or more of a bit error rate (BER), a received signal strength indicator (RSSI) value, and a foreign packet;
    provide a confirmation request for a second user input to deny the reestablish connection request, wherein the confirmation request for the second user input to deny the reestablish connection request is triggered by identifying the at least one error condition; and
    in response to the second user input, prevent the end device from reestablishing a link on the network.

2. The device of claim 1, wherein the network is a mesh network.

3. The device of claim 1, wherein the device is further programmed to:
    reestablish the connection between the device and the end device, based upon the second user input.

4. The device of claim 1, wherein the device is further programmed to:
    identify the BER by determining that a packet error rate for communications from the end device exceed a predetermined threshold.

5. The device of claim 4, wherein the device is further programmed to:
    start a BER timer; and
    determine when the BER timer exceeds a predetermined BER timer threshold.

6. The device of claim 1, wherein the device is further programmed to determine the RSSI value exceeds a predetermined threshold.

7. The device of claim 6, wherein the device is further programmed to:
    start a RSSI timer; and
    determine when the RSSI timer exceeds a predetermined RSSI timer threshold.

8. The device of claim 1, wherein the device is further programmed to:
    identify the foreign packet by comparing an address of the foreign packet to a known address.

9. The device of claim 8, wherein the device is further programmed to:
    start a foreign packet counter; and
    determine when the foreign packet counter exceeds a predetermined foreign packet counter threshold.

10. The device of claim 1, wherein the device is a ZigBee coordinator.

11. A method comprising:
    receiving a reestablish connection request via a first user input to terminate and then reestablish a connection to an end device in a network;
    identifying at least one error condition, the at least one error condition including one or more of a bit error rate (BER), a received signal strength indicator (RSSI) value, and a foreign packet;
    provide a confirmation request for a second user input to deny the reestablish connection request, wherein the confirmation request for the second user input to deny the reestablish connection request is triggered by identifying the at least one error condition; and in response to the second user input, preventing the end device from reestablishing a link on the network.

12. The method of claim 11, wherein the network is a mesh network.

13. The method of claim 11, further comprising reestablishing the connection between the device and the end device, based upon the second user input.

14. The method of claim 11, further comprising:
identify the BER by determining that a packet error rate for communications from the end device exceed a predetermined threshold.

15. The method of claim 14, further comprising:
starting a BER timer; and
determining when the BER timer exceeds a predetermined BER timer threshold.

16. The method of claim 11, further comprising determining the RSSI value exceeds a predetermined threshold.

17. The method of claim 11, further comprising:
starting a RSSI timer; and
determining when the RSSI timer exceeds a predetermined RSSI timer threshold.

18. The method of claim 11, further comprising:
identifying the foreign packet by comparing an address of the foreign packet to a known address.

19. The method of claim 11, further comprising:
starting a foreign packet counter; and
determining when the foreign packet counter exceeds a predetermined foreign packet counter threshold.

* * * * *